United States Patent
Mohammadian

(10) Patent No.: US 8,626,057 B2
(45) Date of Patent: Jan. 7, 2014

(54) ELECTROMAGNETIC E-SHAPED PATCH ANTENNA REPEATER WITH HIGH ISOLATION

(75) Inventor: Alireza Hormoz Mohammadian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 515 days.

(21) Appl. No.: 13/028,849

(22) Filed: Feb. 16, 2011

(65) Prior Publication Data
US 2012/0208451 A1   Aug. 16, 2012

(51) Int. Cl.
*H04B 3/36* (2006.01)
*H04B 7/14* (2006.01)

(52) U.S. Cl.
USPC ........ 455/7; 455/13.1; 455/562.1; 455/575.7; 343/7; 343/767; 343/853

(58) Field of Classification Search
USPC ........... 455/7, 302, 307, 327, 328, 13.1, 13.3, 455/562.1, 575.7; 343/786, 772, 848, 703, 343/700, 853, 767
See application file for complete search history.

(56) References Cited

U.S. PATENT DOCUMENTS

| | | | |
|---|---|---|---|
| 5,373,297 A | | 12/1994 | Briguglio |
| 7,126,553 B1* | | 10/2006 | Fink et al. .................... 343/767 |
| 7,463,200 B2 | | 12/2008 | Gainey et al. |
| 7,592,969 B2 | | 9/2009 | Proctor, Jr. et al. |
| 7,733,285 B2 | | 6/2010 | Gainey et al. |
| 2002/0014995 A1* | | 2/2002 | Roberts ................. 343/700 MS |
| 2002/0163478 A1* | | 11/2002 | Pleva et al. ..................... 343/853 |
| 2003/0011519 A1* | | 1/2003 | Breglia et al. .......... 343/700 MS |
| 2005/0151687 A1* | | 7/2005 | Poe et al. ................ 343/700 MS |
| 2008/0129613 A1* | | 6/2008 | Ermutlu et al. ................ 343/703 |
| 2009/0088071 A1 | | 4/2009 | Rofougaran |
| 2009/0323582 A1 | | 12/2009 | Proctor, Jr. et al. |
| 2010/0001080 A1 | | 1/2010 | Sim et al. |

(Continued)

FOREIGN PATENT DOCUMENTS

KR   20090133087 A   12/2009
WO   2006099347 A2   9/2006

OTHER PUBLICATIONS

International Search Report and Written Opinion—PCT/US2012/025501—ISA/EPO—May 16, 2012.

(Continued)

*Primary Examiner* — Sujatha Sharma
(74) *Attorney, Agent, or Firm* — Thien T. Nguyen

(57) ABSTRACT

A repeater system is disclosed including a first planar antenna array comprising a first plurality of patch antennas, wherein the first plurality of patch antennas include a first pair of first patch antennas and a second pair of patch antennas, the first patch antennas in each pair disposed symmetrically about a perpendicular plane bisecting a distance between the patch antennas in each pair. Two microstrip antenna probes may be connected to respective ones of the first patch antennas in each pair. The two feed signals connected to the two probes may be phased shifted approximately 180 degrees out of phase with respect to each other. The repeater also includes a second planar antenna array comprising a second plurality of patch antennas and a housing connecting the first planar antenna array and the second planar antenna array. In some embodiments, each of the first planar antenna array and the second planar antenna array include some even number of E-shaped patch antennas.

21 Claims, 7 Drawing Sheets

(56) References Cited

U.S. PATENT DOCUMENTS

2010/0002620 A1 1/2010 Proctor, Jr. et al.
2010/0045553 A1 2/2010 Ohira et al.
2010/0207830 A1* 8/2010 Parsche .................. 343/732

OTHER PUBLICATIONS

Anguera, J. et al.; "Dual-frequency broad-band stacked microstrip patch antenna;" Source: IEEE Antennas and Wireless Propagation Letters, v 2, 36-9, 2003.

So, Kwok Kan et al.; "A miniature circularly polarization patch antenna using E-shaped shorting strip;" Antennas and Propagation (EuCAP), 2010 Proceedings of the Fourth European Conference on: Publication Date: Apr. 12-16, 2010; pp. 1-3.

Abutarboush, H.F. et al.; "A Connected E-Shape and U-Shape Dual-Band Patch Antenna for Different Wireless Applications," Wireless Networks & Communications Group (WNCG), School of Engineering & Design, Brunel University, West London, UK, pp. 1-5, Jul. 2008.

Ang, B.-K. et al.; "A Wideband E-Shaped Mierostrib Patch Antenna for 5-6 Ghz Wireless Communications," Progress in Electromagnetics Research, PIER 75, pp. 397-407, 2007.

* cited by examiner

ELECTROMAGNETIC E-SHAPED PATCH ANTENNA REPEATER WITH HIGH ISOLATION

BACKGROUND

Repeaters are often used to extend the coverage area of a network and facilitate reception and transmission of signals in areas of inadequate network coverage. A simple repeater system is a type of bi-directional amplifier that includes a donor antenna, a coverage antenna (or sometimes referred to as a service antenna), and signal processing circuitry. In a typical arrangement, the donor antenna is a directional antenna pointing toward a signal source, and the coverage antenna is a rebroadcast antenna. The signal processing circuitry (which typically includes a signal amplifier) may be configured to provide gain (e.g., at least 10 dB of gain in most applications) to the received signal and prepare the signal for rebroadcasting. In addition to amplification, the signal processing circuitry may act on the physical signal itself to reshape, retime, filter, or perform any combination of these functions on the physical signal before the signal is rebroadcasted using the coverage antenna.

Repeaters may use the same frequency or different frequencies to receive and rebroadcast the signal. When a repeater uses the same frequency to receive and rebroadcast signals (sometimes called an "on-frequency" repeater), a high degree of isolation between the received and transmitted signals is important for stable operation of the repeater. In practice, isolation is generally achieved by physically separating the donor antenna from the coverage antenna. For example, isolation is generally proportional to the vertical and/or horizontal separation of the donor antenna and the coverage antenna. Increased isolation may also be achieved using various interference cancellation techniques (e.g., echo cancellation techniques) and proper selection and design of the antenna types for the donor and coverage antennas.

A high degree of isolation between the donor antenna signal and the coverage antenna signal is particularly difficult to achieve, however, when a highly compact form factor is desired. A highly compact form factor can be achieved by having the donor antenna and the coverage antenna positioned back-to-back in a single package or system. In such systems, a high degree of physical separation between the donor antenna and the coverage antenna is generally not practical or not possible.

Increased isolation between the donor antenna signal and the coverage antenna signal typically results in less signal interference between the two antennas, higher signal integrity, and improved signal strength, which may, in turn, result in increased battery life of a mobile device, decreased emitted radiation from the mobile device, and an overall improved user experience.

SUMMARY

In view of the foregoing, a repeater system is provided including a first planar antenna array. The first planar antenna array includes a plurality of first patch antennas, wherein the plurality of first patch antennas includes a first pair of the first patch antennas and a second pair of the first patch antennas, wherein the first patch antennas in each pair of first patch antennas are disposed symmetrically about a perpendicular plane bisecting a distance between the first patch antennas in each pair of first patch antennas. A first microstrip antenna probe and a second microstrip antenna probe are connected to respective ones of the first pair of first patch antennas. First phase shifting circuitry is connected to the first microstrip antenna probe and the second microstrip antenna probe, the first phase shifting circuitry configured to receive an input signal, supply a first signal to the first microstrip antenna probe, and supply a second signal to the second microstrip antenna probe using the input signal such that the first signal and the second signal are approximately 180 degrees out of phase with respect to each other. A second planar antenna array including a plurality of second patch antennas is connected to the first planar array with a housing.

In some embodiments, the plurality of second patch antennas includes pairs of second patch antennas, wherein the second patch antennas in each pair of second patch antennas are disposed symmetrically about a perpendicular plane bisecting the distance between the second patch antennas in each pair of second patch antennas. One or more of the plurality of first patch antennas and the plurality of second patch antennas may include a plurality of E-shaped patch antennas.

DETAILED DESCRIPTION

Figure 1:
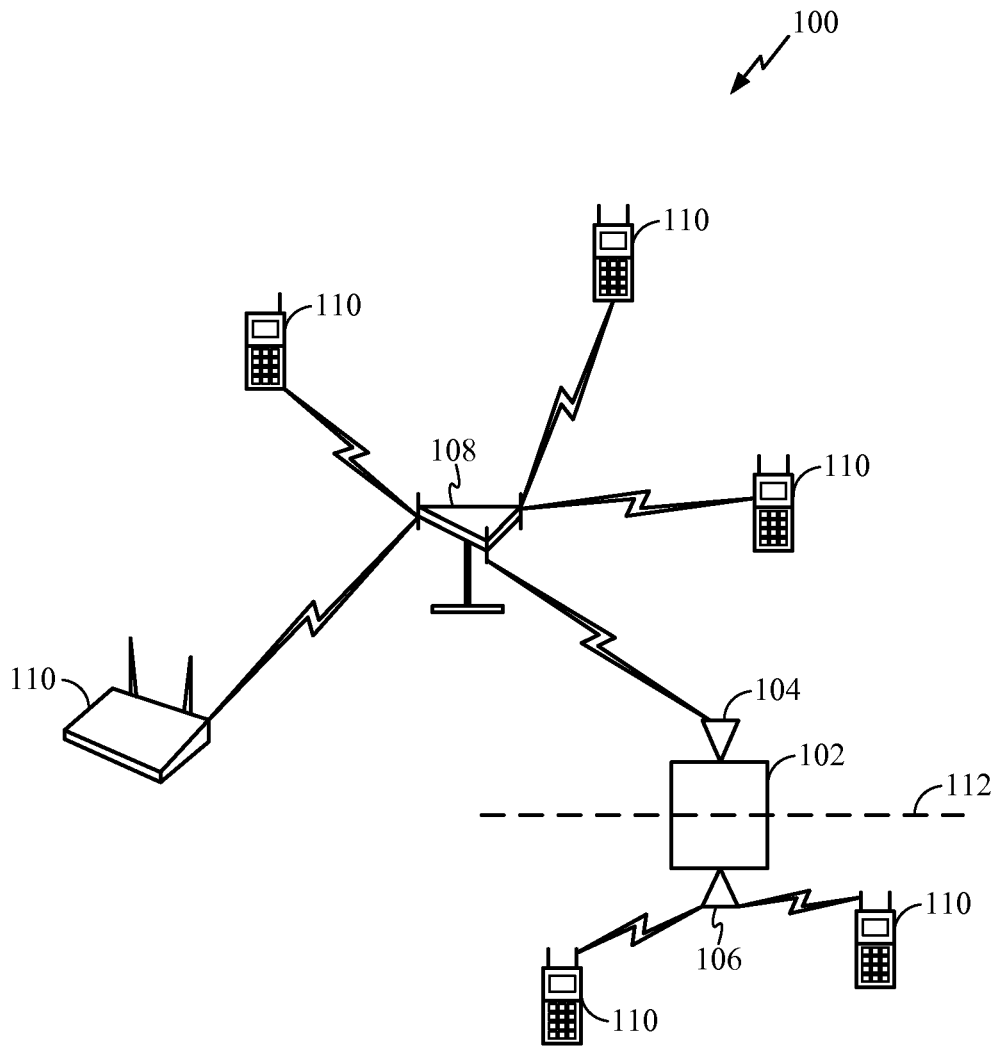
FIG. 1 is a block diagram of a wireless network implementing a repeater.

Antenna systems with high isolation for repeaters are disclosed. The antenna systems may include a donor antenna (or antenna array) that receives a wireless signal from a transmitter (or series of transmitters) and a coverage antenna (or antenna array) that retransmits or rebroadcasts the received wireless signal into an area of inadequate network coverage (e.g., an indoor area of a residence or an enterprise space). The coverage antenna may amplify, reshape, retime, filter, or otherwise enhance the wireless signal before retransmission.

An example of an antenna system includes donor and coverage antenna arrays that are located on opposite faces of a thin housing that contains repeater electronics. An array of four E-shaped patch antennas are used for the donor aperture, and an array of four E-shaped patch antennas are used for the coverage aperture. More or fewer E-shaped patch antennas may be included in each array (e.g., the coverage array and the donor array) in other embodiments. For example, any even number of E-shaped patch antennas may be included in each array in some embodiments. Each array may be grouped into a plurality of pairs of E-shaped patch antennas that are symmetrically disposed. For example, if the array for the donor aperture includes four E-shaped patch antennas, each pair of two patch antennas may be disposed symmetrically about a perpendicular plane separating the two patch antennas in each pair (and bisecting the distance between the antennas in each pair). Each pair of antennas is dual-fed by two microstrip feed probes. The two microstrip feed probes of each antenna pair are fed approximately 180 degrees out of phase with respect to one another in order to reduce (or eliminate) the radiation from the microstrip feed probes. Phase shifting circuitry (e.g., a rat-race circuit) may be connected to each set of microstrip feed probes. The phase shifting circuitry may be configured to produce two feed signals shifted approximately 180 degrees out of phase with respect to one another and supply these two feed signals to the two feed probes for each pair. The phase shifting circuitry may be attached under the ground planes of the antenna array (e.g., within the thin housing) and may be further independently and separately shielded to reduce or eliminate cross-talk between the circuits.

The coverage antenna array and the donor antenna array are disposed so that the co-polarized radiation generated by the respective arrays are orthogonal to one another. For example, one antenna array may be rotated 90 degrees with respect to the other antenna array. This rotation allows for the principle radiation from the two arrays to be cross-polarized, further enhancing the isolation of the two arrays. Each of the coverage antenna and the donor antenna may be configured to receive and/or retransmit electromagnetic radiation in the UMTS band. Any other suitable frequency bands may also be supported.

Signal or interference cancellation circuitry (e.g., echo cancellation circuitry) may be included in the thin housing that contains the repeater electronics and connects the donor and coverage antenna arrays. It has been found that at least 10 dB of gain may be provided by either antenna design with at least 80 dB of total isolation (from both the antenna design and interference cancellation techniques) between the donor antenna array signal and the coverage antenna array signal, although these gain and isolation values are not required.

An example of an antenna system is described below for an on-frequency repeater system. Being designed for use in UMTS network, the repeater system operates with desired characteristics to cover UMTS frequency bands. For example, some common supported UMTS frequency bands include the 900 MHz, 1900 MHz, and 2100 MHz bands (popular for tri-band cellular telephones), although other bands may additionally or alternatively be supported. The antenna system is designed to have desired gain, e.g., at least 10 dB, and desired isolation, e.g., 80 dB when combined with interference cancellation techniques, in order to be free from oscillations that can be caused by positive feedback.

FIG. 1 shows a wireless network 100 implementing a repeater 102. Wireless network 100 includes a wireless transceiver 108 (e.g., a base station, radio tower, or distribution center) that communicates with mobile stations 110 located in a coverage area of wireless network 100. For example, wireless transceiver 108 may be a UMTS base station configured to receive and transmit audio, video, and data over UMTS frequency bands. Wireless transceiver 108 may additionally or alternatively be configured to transmit and/or receive other suitable types of signals over any other suitable frequency or frequencies.

Repeater 102 includes a donor antenna 104 and a coverage antenna 106. Donor antenna 104 is preferably located in an area of adequate network coverage (e.g., an area where the signal exceeds a specified threshold) while coverage antenna 106 may be located in an area of inadequate network coverage (e.g., an area where the signal does not exceed the same specified threshold or some different threshold). For example, donor antenna 104 may be an external antenna located outside of building periphery 112 and coverage antenna 106 may be an internal antenna located inside of building periphery 112. One or both of donor antenna 104 and coverage antenna 106 may actually be antenna arrays that include a plurality of antennas. Wireless transceiver 108 may communicate with mobile stations 110 over any suitable wireless channels, such as frequency-division duplexed (FDD) channels.

Mobile stations 110 may include any wireless devices, including cellular telephones, personal digital assistants (PDAs), portable computers, wireless access points, telemetry devices, and any combination of the foregoing, that are capable of receiving signals from wireless transceiver 108 via wireless links. Mobile stations 110 may also include other types of wireless access terminals, including fixed wireless terminals.

Figure 2:
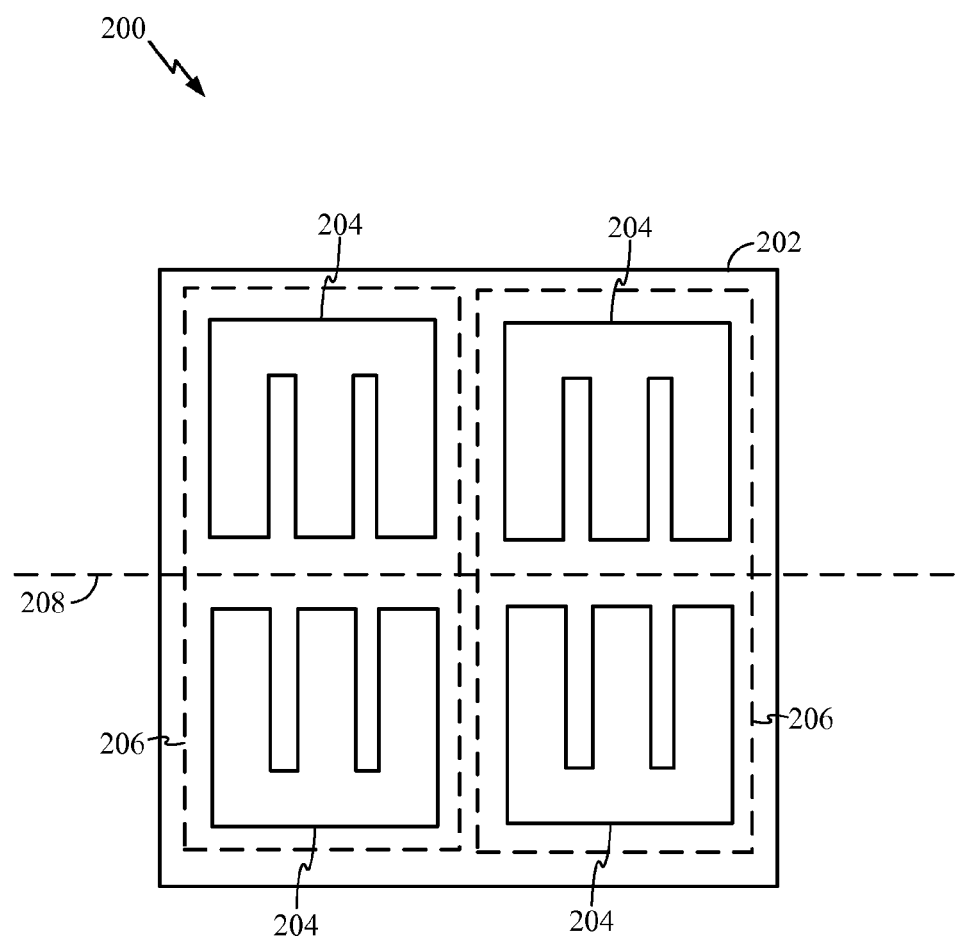
FIG. 2 is a schematic diagram of an E-shaped patch antenna array.
Figure 3:
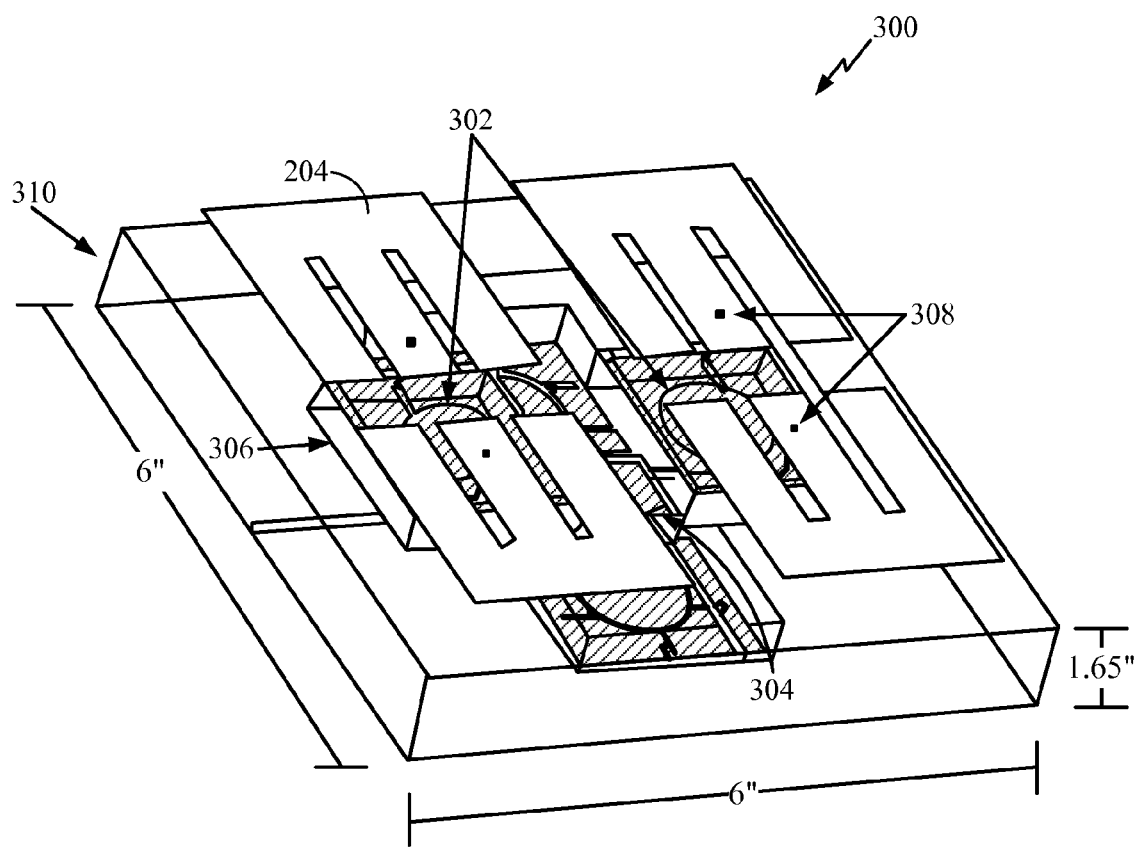
FIG. 3 is a schematic diagram of the E-shaped patch antenna array of FIG. 2 shown in more detail.

Repeater 102 may take many forms. In one repeater design, the repeater includes two arrays of E-shaped patch antennas. One array is used for the donor antenna and the other array is used for the coverage antenna. As shown in FIG. 2, planar antenna array 200 includes four E-shaped patch antennas 204. E-shaped patch antennas 204 may be used instead of rectangular or square patch antennas to support a high UMTS bandwidth. The E-shaped patch antennas 204 may be suspended above ground plane 202 at a height of approximately 8 to 12 mm for obtaining a minimum of 10 dB return loss at the band edges. Ground plane 202 may be composed of any electrically conductive material and may be part of the thin housing that holds the repeater electronics, as shown in FIG. 3 below. The suspended patches may be supported by Styrofoam or a variety of other plastic or polymer-type spaces.

Pairs of the E-shaped patch antennas 204 in each array may be disposed in groups 206. Each pair of antennas in a group 206 may be disposed so that the antennas 204 are mirror images of one another with respect to a plane 208 perpendicular to the antennas 204 in group 206 and bisecting the space between the antennas 204. Although two groups 206 are shown in the example of FIG. 2, more or fewer groups may be included in other arrangements. For example, three groups (i.e., six patch antennas), four groups (i.e., eight patch antennas), six groups (i.e., 12 patch antennas), or any other suitable number of groups may be included in other arrangements. Any suitable even number of patch antennas may be included in each array.

For rectangular or square patch antennas, one way to mitigate cross-polarized radiation resulting from a feed probe is to use two appropriately spaced, symmetrically disposed feed probes that are fed approximately 180 degrees out of phase. An E-shaped patch antenna, however, does not lend itself to this dual-fed approach because an E-shaped patch antenna does not have a symmetric structure. By grouping pairs of E-shaped patch antennas in groups 206, a symmetric structure is created that is suitable to be fed by two microstrip feed probes with input signals approximately 180 degrees out of phase. Each group 206 may be fed by two such microstrop feed probes that extend from each group 206 down to the ground plane 202 where the probes are soldered to the center conductor of a coax feed cable or to a trace on an RF board that may reside inside the electronics box (e.g., the thin housing) or over the box's external surface.

FIG. 3 shows repeater 300 with one planar antenna array (e.g., either the donor array or the coverage array) visible. As described above, the antenna array not visible in FIG. 3 (the underside array) may be identical to the visible array except for being disposed rotated 90 degrees with respect to the visible array so as to generate orthogonal fields. Each array includes four E-shaped patch antennas 204 with a feed point 308 on each patch. As discussed above in connection with FIG. 2, each pair of antennas 204 may be grouped and be fed by two distinct feed probes 308. The two feed points 308 may be symmetrically disposed in each group about a plane perpendicular to the antennas 204 in each group and bisecting the space between the antennas 204.

The 180-degree phase shift between the feed signals to each E-shaped patch pair is provided by rat-race circuits 302. One rat-race circuit may supply both an input feed signal to a first feed point 308 in a group and supply a 180-degree phase sifted version of the input feed single to a second feed point in the same group. As shown in FIG. 3, four rat-race circuits 302 are provided (two servicing the donor array and two servicing the coverage array). The power to the output terminals of the two rat-race circuits servicing each array is distributed by a Wilkinson or other comparable power divider 304. One power divider 304 may be included for the donor array and a separate power divider 304 may be included for the coverage array. The phase shift between the feed signals may serve to both increase the isolation between the donor array and the coverage array and obtain a symmetric radiation beam for the donor array and the coverage array.

As shown in FIG. 3, the rate-race circuit 302 and the power dividers 304 may all be included within thin metal housing 310. Even though these circuits and dividers may be within housing 310, they may also include separate individual shielding 306 in order to prevent a stray resonance creep into the desired band of frequencies. The overall dimensions of repeater 300 may be approximately 6"×6"×1.65" (or within ±⅓ of each of the foregoing dimensions and additionally within standard manufacturing tolerances).

In some embodiments, the feed network (e.g., the rat-races circuits 302 and the power divider 304) is etched on a low cost substrate (such as FR-4) and no shielding is used. The solid copper on the back side of the PCB serves as the ground plane for the antenna and the feed circuit. Together with the bottom array, these two ground planes may make up the top and bottom cover of the electronics box for the repeater. This arrangement may be more suitable for commercial mass production.

Housing 310 may include various repeater electronics and may additionally serve as the ground planes for the donor antenna array and the coverage antenna array.

The repeater electronics may include, for example, one or more signal amplifiers, signal processors, analog-to-digital converters (ADCs), digital-to-analog converters (DACs), clocks, and local oscillators. The signal processors may be configured to filter or enhance the received signal before retransmission. For example, the signal processor may perform various filtering and interference cancellation techniques (e.g., echo cancellation) on the received signal before amplifying and rebroadcasting the signal. Housing 310 may be composed of any electrically conductive material (e.g., metal) suitable for a ground plane and may be slightly larger than the size of the donor or coverage antenna array. One or both of the donor array and the coverage antenna array may be enclosed in a plastic radome to protect the antenna array from damage (e.g., due to adverse weather or climate conditions).

The repeater 300 may be disposed vertically with the housing 310 perpendicular to the ground. In actual implementations, the repeater may be mounted in any suitable orientation. The donor antenna array is generally disposed facing an area of good coverage while the coverage antenna array is generally disposed facing an area of poor coverage. For example, the donor antenna array may be disposed in an area of signal coverage that exceeds a predefined threshold signal strength or signal integrity. The coverage antenna array may be disposed in an area of signal coverage that does not exceed the predefined (or some other) threshold signal strength or signal integrity.

Figure 4:
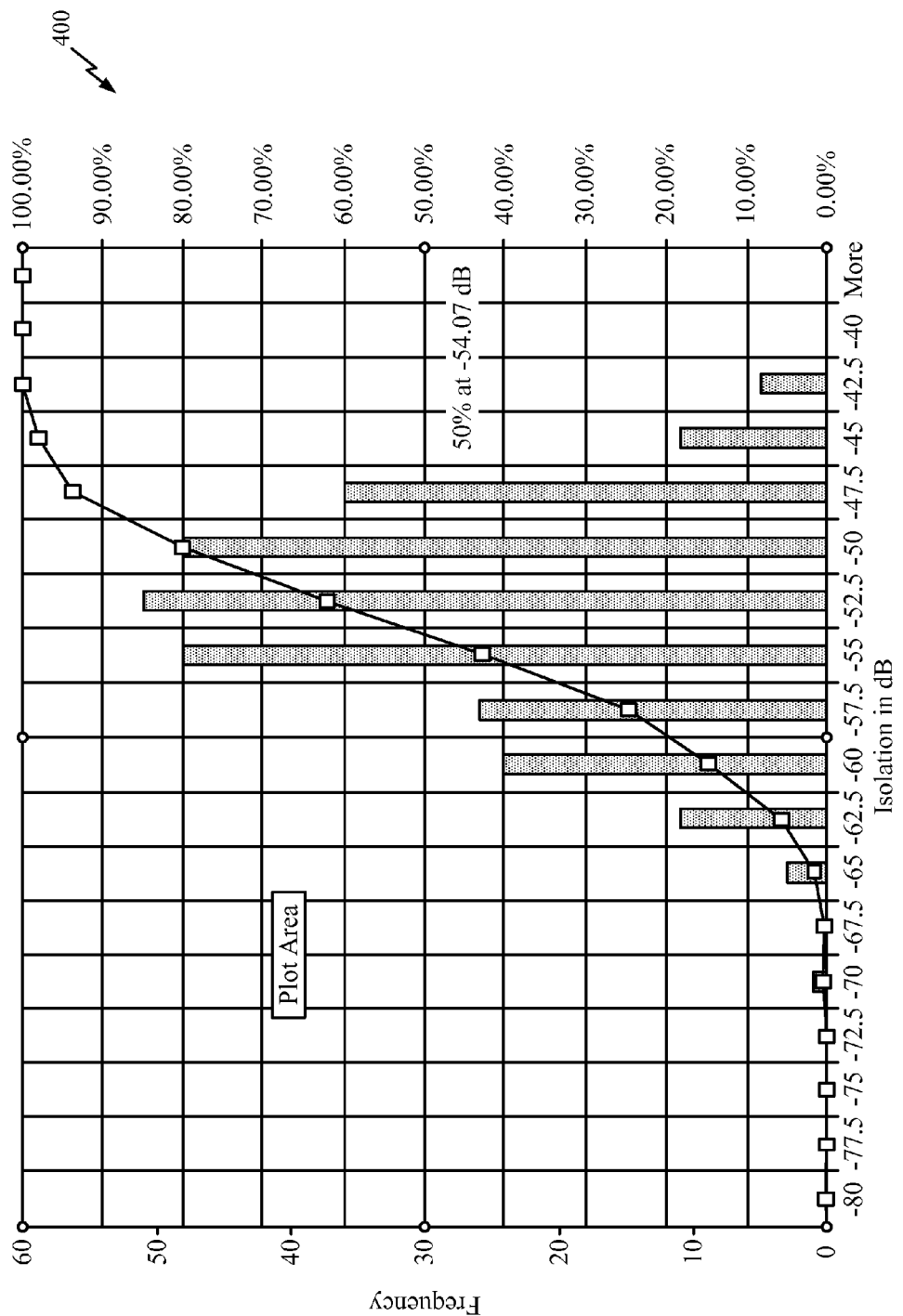
FIGS. 4, 5, and 6 are isolation histograms of a repeater system using the patch antenna arrays of FIGS. 2 and 3.

FIG. 4 shows an uplink histogram 400 of statistical isolation in scattering environments of repeater 300 (FIG. 3). The histogram 400 shows the probability distribution of the isolation between the donor antenna array signal and the coverage antenna array signal by depicting the frequency of observations of a particular isolation in a prototype system for uplink UMTS frequencies. As shown in the histogram 400, isolation values between 70 dB and 42.5 dB were observed in the test environment with the most frequent isolation observations occurring near 52.5 dB. As described above, the isolation provided by the repeater design combined with interference cancellation techniques is expected to exceed 80 dB of total isolation between the donor antenna array signal and the coverage antenna array signal.

Figure 5:
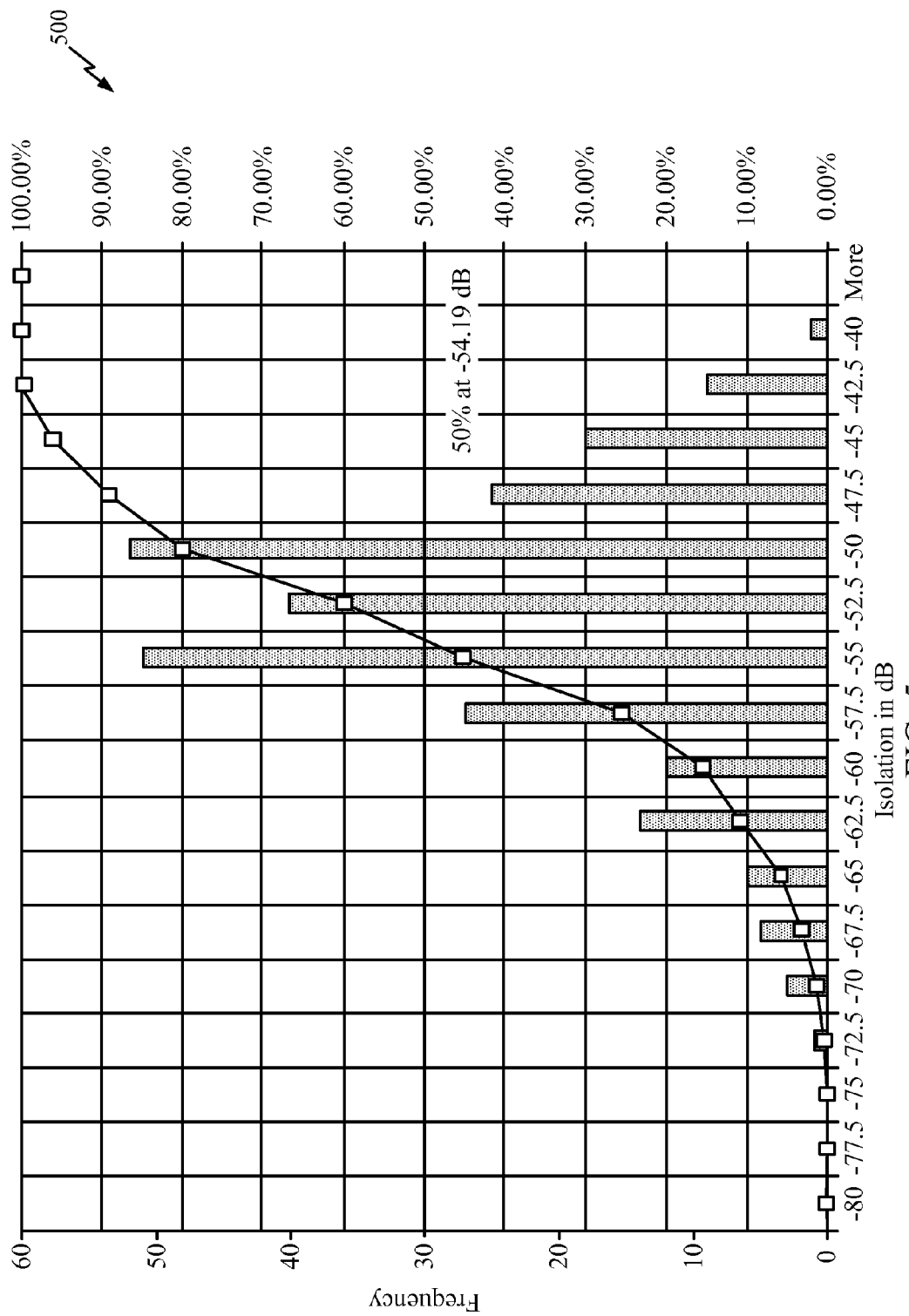

FIG. 5 shows a downlink histogram 500 of statistical isolation in scattering environments of repeater 300 (FIG. 3). The histogram 500 shows the probability distribution of the isolation between the donor antenna array signal and the coverage antenna array signal by depicting the frequency of observations of a particular isolation in a prototype system for downlink UMTS frequencies. As shown in the histogram 500, isolation values between 72.5 dB and 40 dB were observed in the test environment with the most frequent isolation observations occurring between 57.5 dB and 50 dB. As described above, the isolation provided by the repeater design combined with interference cancellation techniques is expected to exceed 80 dB of total isolation between the donor antenna array signal and the coverage antenna array signal.

Figure 6:
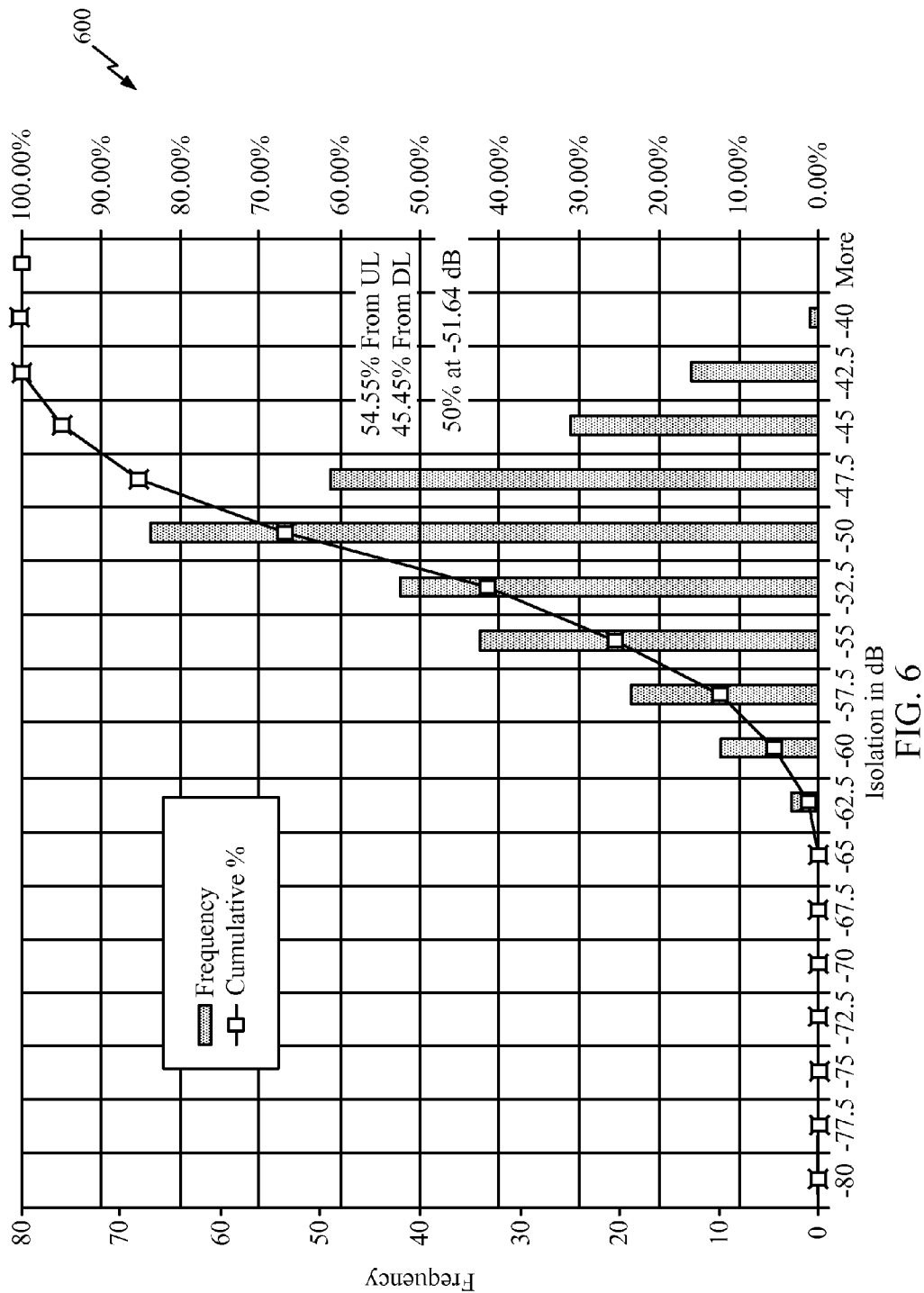

FIG. 6 shows a worst-case histogram 600 of statistical isolation in scattering environments of repeater 300 (FIG. 3). The histogram 600 shows the probability distribution of the isolation between the donor antenna array signal and the coverage antenna array signal by depicting the frequency of observations of a particular isolation in a prototype system for the worst-case uplink/downlink UMTS frequencies. As shown in the histogram 600, isolation values between 62.5 dB and 40 dB were observed in the test environment with the most frequent isolation observations occurring at 50 dB. As described above, the isolation provided by the repeater design combined with interference cancellation techniques is expected to exceed 80 dB of total isolation between the donor antenna array signal and the coverage antenna array signal.

Figure 7:
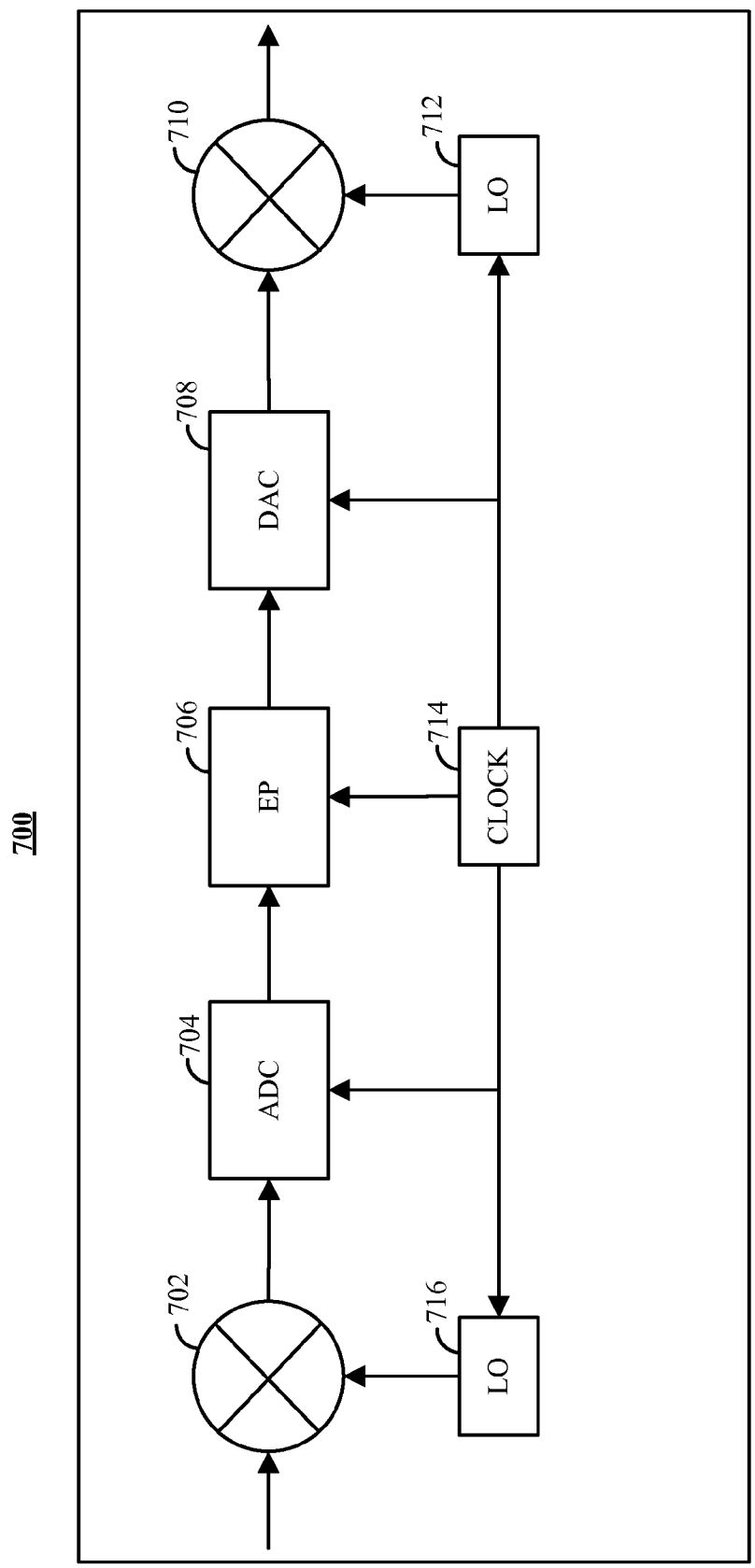
FIG. 7 is a simplified block diagram of an echo canceller.

In some embodiments, an echo canceller 700 as shown in FIG. 7 may be connected to the coverage and donor antenna arrays to improve isolation between the coverage array signal and the donor array signal. The echo canceller 700 may be part of more general interference cancellation circuitry or signal processing circuitry that is included as part of the repeater electronics. The signal processing circuitry may be housed in housing 310 (FIG. 3) and may be independently shielded. The signal processor circuitry may provide further isolation between the donor and coverage antenna signals by detecting and attenuating signals coupled from the transmitter antenna to the receiver antenna for both the forward (downlink) channel and the reverse (uplink) channel. The signal processing circuitry may include a down-conversion mixer 702, an analog-to-digital converter (ADC) 704, an echo processor 706, a digital-to-analog converter (DAC) 708, an up-conversion mixer 710, local oscillators 712 and 716, and a clock 714.

The incoming RF signal from a low noise amplifier (LNA) may be down-converted to baseband (or intermediate frequency (IF)) by the down-conversion mixer 702 and local oscillator 716. The ADC 704 may convert the output of the mixer 702 to digital samples, which are stored in memory in the echo processor 706. The echo processor 706 may remove feedback (i.e., echoes and other interference) from the digital samples. The filtered samples are converted back to an analog signal by the DAC 708. The up-conversion mixer 710 and local oscillator 712 may up-convert the output of the DAC 708 to an RF signal that is fed to the input of the high power amplifier (HPA).

Alternatively, the ADC sampling may be performed in the RF band of the received signal or at an IF level. The samples may be taken over a time interval that represents the maximum propagation time expected for the latest arriving echo, generally less than 1 microsecond for an in-building or home environment. To reduce the throughput of sampled data (e.g., in bits/sec), sub-Nyquist sampling rates in either the RF band or in the IF band may be used. The ADC may have a dynamic range and sampling frequency to differentiate the original, non-delayed signal from the amplified, delayed echo.

The echo processor 706 may search for any time-delayed echoes in the sampled data and subtract any detected echoes from the sampled data stream. In order to reduce the correlation between the original signal and echoed signals, the resulting signal samples are typically delayed in a delay buffer for a time specified by a controller of echo processor 706. Conventional auto-correlation methods may be used to determine the time delay of each echo. The echo detection and echo subtraction may occur serially or in multiple parallel branches, one for each expected echo. Various other techniques for echo cancellation and interference cancellation using echo processor 706 may additionally or alternatively be used in other embodiments.

Various modifications, alternative constructions, and equivalents may be used without departing from the scope of the disclosure. For example, one or more elements described above may be a component of a larger system, wherein other rules may take precedence over or otherwise modify the application of the particular example or element. Also, a number of steps may be undertaken before, during, or after the above elements are considered. Accordingly, the above description does not limit the scope of the disclosure, including the appended claims, to the examples provided.

What is claimed is:

1. A repeater system comprising:
    a first planar antenna array comprising a plurality of first patch antennas, wherein the plurality of first patch antennas comprises a first pair of the first patch antennas and a second pair of the first patch antennas, wherein the first patch antennas in each pair of first patch antennas are disposed symmetrically about a perpendicular plane bisecting a distance between the first patch antennas in each pair of first patch antennas;
    a first microstrip antenna probe and a second microstrip antenna probe connected to respective ones of the first pair of first patch antennas;
    first phase shifting circuitry connected to the first microstrip antenna probe and the second microstrip antenna probe, the first phase shifting circuitry configured to:
        receive an input signal,
        supply a first signal to the first microstrip antenna probe, and
        supply a second signal to the second microstrip antenna probe using the input signal such that the first signal and the second signal are approximately 180 degrees out of phase with respect to each other;
    a second planar antenna array comprising a plurality of second patch antennas; and
    a housing connecting the first planar antenna array and the second planar antenna array.

2. The repeater system of claim 1 wherein the plurality of second patch antennas comprises pairs of second patch antennas, wherein the second patch antennas in each pair of second patch antennas are disposed symmetrically about a perpendicular plane bisecting the distance between the second patch antennas in each pair of second patch antennas.

3. The repeater system of claim 1 wherein the first planar antenna array and the second planar antenna array are disposed so that their respective co-polarized radiations are orthogonal to one another.

4. The repeater system of claim 3 wherein the second planar antenna array is similar to the first planar antenna array and disposed approximately 90 degrees in relation to the first planar antenna array.

5. The repeater system of claim 1 further comprising:
    a third microstrip antenna probe and a fourth microstrip antenna probe connected to respective ones of the second pair of first patch antennas; and
    second phase shifting circuitry connected to the third microstrip antenna probe and the fourth microstrip antenna probe.

6. The repeater system of claim 5 wherein each of the first phase shifting circuitry and the second phase shifting circuitry comprises a rat-race circuit.

7. The repeater system of claim 6 wherein the rat-race circuits are separately and independently electromagnetically shielded from other circuitry in the repeater system.

8. The repeater system of claim 6 further comprising power divider circuitry connected to the rat-race circuits.

9. The repeater system of claim 1 wherein the first planar antenna array is configured to receive and transmit signals in at least one UMTS frequency band.

10. The repeater system of claim 1 wherein the housing is composed of electrically conductive material.

11. The repeater system of claim 10 wherein the housing is disposed to provide a ground plane for the first planar antenna array.

12. The repeater system of claim 1 wherein the first planar antenna array is suspended above the ground plane at a height of approximately 8 to 12 mm.

13. The repeater system of claim 1 wherein the plurality of first patch antennas comprises a plurality of E-shaped patch antennas.

14. The repeater system of claim 13 wherein the plurality of second patch antennas comprises a plurality of E-shaped patch antennas.

15. The repeater system of claim 14 wherein each of the plurality of first patch antennas and the plurality of second patch antennas comprises exactly four E-shaped patch antennas.

16. The repeater system of claim 15 wherein an overall dimension of the repeater system is approximately 6"×6"×1.65".

17. The repeater system of claim 1 further comprising interference cancellation circuitry coupled to the first planar antenna array and the second planar antenna array and configured to identify and subtract echoes from a sampled data stream.

18. A repeater system comprising:
    a first planar antenna array comprising a plurality of first patch antennas, wherein the plurality of first patch antennas comprises a first pair of first patch antennas and a second pair of first patch antennas, wherein the first patch antennas in each pair of first patch antennas are disposed symmetrically about a first perpendicular plane bisecting a first distance between the first patch antennas in each pair of first patch antennas;
    a first microstrip antenna probe and a second microstrip antenna probe connected to respective ones of the first patch antennas in each pair of first patch antennas;
    first phase shifting circuitry connected to the first microstrip antenna probe and the second microstrip antenna probe, the first phase shifting circuitry configured to:
        receive a first input signal,
        supply a first signal to the first microstrip antenna probe, and supply a second signal to the second microstrip antenna probe using the first input signal such that the first signal and the second signal are approximately 180 degrees out of phase with respect to each other;

a second planar antenna array comprising a plurality of second patch antennas, wherein the plurality of second patch antennas comprises a first pair of second patch antennas and a second pair of second patch antennas, wherein the second patch antennas in each pair of second patch antennas are disposed symmetrically about a second perpendicular plane bisecting a second distance between the second patch antennas in each pair of second patch antennas;

a third microstrip antenna probe and a fourth microstrip antenna probe connected to respective ones of second patch antennas in each pair of second patch antennas; and second phase shifting circuitry connected to the third microstrip antenna probe and the fourth microstrip antenna probe, the second phase shifting circuitry configured to:

receive a second input signal, supply a third signal to the third microstrip antenna probe, and supply a fourth signal to the fourth microstrip antenna probe using the second input signal such that the third signal and the fourth signal are approximately 180 degrees out of phase with respect to each other;

wherein the first planar antenna array and the second planar antenna array are disposed so that their respective co-polarized radiations are orthogonal to each other.

19. The repeater system of claim 18 wherein each of the plurality of first patch antennas and the plurality of second patch antennas comprises exactly four E-shaped patch antennas.

20. A repeater system comprising:

a first planar antenna array comprising a plurality of first patch antennas, wherein the plurality of first patch antennas comprises a first pair of the first patch antennas and a second pair of the first patch antennas, wherein the first patch antennas in each pair of first patch antennas are disposed symmetrically about a perpendicular plane bisecting a distance between the first patch antennas in each pair of first patch antennas;

a first microstrip antenna probe and a second microstrip antenna probe connected to respective ones of the first pair of first patch antennas;

phase shifting means connected to the first microstrip antenna probe and the second microstrip antenna probe for:

receiving an input signal, supplying a first signal to the first microstrip antenna probe, and supplying a second signal to the second microstrip antenna probe using the input signal such that the first signal and the second signal are approximately 180 degrees out of phase with respect to each other;

a second planar antenna array comprising a plurality of second patch antennas; and means for connecting the first planar antenna array and the second planar antenna array.

21. The repeater system of claim 20 wherein the plurality of first patch antennas comprises a plurality of E-shaped patch antennas.

* * * * *